2,990,404
RECOVERY OF 5-AMINOHEXAHYDRO-PYRIMIDINES

John B. Tindall, Terre Haute, Ind., assignor to Commercial Solvents Corporation, New York, N.Y., a corporation of Maryland
No Drawing. Filed June 3, 1959, Ser. No. 817,720
7 Claims. (Cl. 260—256.4)

My invention relates to the purification of 5-amino-hexahydropyrimidines containing traces of nickel.

5-aminohexahydropyrimidines are usually prepared by the process described in U.S. Patent 2,387,043, issued to Murray Senkus. Briefly, this process consists essentially of subjecting a 5-nitrohexahydropyrimidine to liquid phase hydrogenation in the presence of a nickel hydrogenation catalyst and a solvent at pressures above 500 lbs. and at temperatures ranging from about 25 to about 100° C. and fractionally distilling the resulting hydrogenation product to recover the 5-aminohexahydropyrimidine.

5-aminohexahydropyrimidines having the following general formula

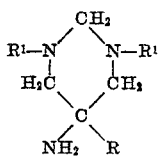

wherein R is hydrogen, aryl, alkyl or hydroxyalkyl and $R^1$ is alkyl, aralkyl, aryl, 2-hydroxyalkyl, dialkylamine and 3,5-dioxycyclohexyl produced by the above-described process are generally of poor color and purity and the yields are often low and tend to vary greatly from batch to batch. The poor color, lack of purity and generally low yields are believed to be caused by the presence in the 5-aminohexahydropyrimidines of nickel oxidation products from the nickel catalyst which contaminate the product during the reduction reaction. Previous purification methods have failed to effect satisfactory separation of the nickel oxidation products from the 5-aminohexahydropyrimidines. Even repeated distillations do not cause proper separation and, therefore, do not permit production of a substantially pure product.

I have now discovered a process whereby improved yields of substantially pure, colorless, 5-aminohexahydropyrimidines are obtained from an impure 5-aminohexahydropyrimidine containing traces of nickel.

My invention consists essentially of adding an amount of aqueous ammonia to a 5-aminohexahydropyrimidine containing nickel required to form a water-soluble nickel-ammonia complex with the nickel present therein, allowing an oil layer and a water layer containing the nickel-ammonia complex to form and fractionally distilling the oil layer to recover the substantially pure, colorless, 5-aminohexahydropyrimidine.

In carrying out my invention, I can prepare the impure 5-amino-hexahydropyrimidines by the above-described hydrogenation process of U.S. Patent No. 2,387,043. After hydrogenation, the solid nickel catalyst is preferably removed from the hydrogenation product by filtration or other suitable means. The solvent is then removed from the hydrogenation product by any suitable means. I then add to the hydrogenation product amounts of water and ammonia to form a water soluble complex with the retained nickel therein. In carrying out the addition step, I can either add the ammonia in the form of an aqueous solution, or I can first add ammonia and then add water. I prefer to add the ammonia in the form of a 1–30% aqueous ammonia solution by weight based on the weight of the solution, a sufficient amount of the solution being added to the hydrogenation product to give from about 0.1 to about 10% ammonia by weight, based on the weight of the hydrogenation product. However, it is equally suitable to first add anhydrous ammonia and then add water, the former and the latter being added in amounts sufficient to form a 1–30% by weight aqueous solution of ammonia, based on the weight of the solution, and to give from about 0.1 to about 10% ammonia by weight, based on the weight of the hydrogenation product. The treated hydrogenation product is then allowed to separate into an oil layer and a water layer containing the nickel-ammonia complex. The oil layer is fractionally distilled under vacuum to recover the substantially pure colorless 5-aminohexahydropyrimidine.

The following examples will serve to illustrate my invention, but I do not intend to be limited by the amounts or particular procedures shown therein.

EXAMPLE I

A 600 g. portion of impure 5-amino-5-methyl-1,3-bis-(2-ethylhexylhexahydropyrimidine containing traces of nickel was obtained by the hydrogenation of 5-nitro-5-methyl - 1,3 - bis(2 - ethylhexyl)hexahydropyrimidine using the procedure described in U.S. Patent 2,387,043 and then divided into two equal portions. One portion was treated as described in Example I, while the other portion was treated as described in Example II.

To a suitable container containing 300 g. of the impure 5-amino-5-methyl-1,3-bis(2-ethylhexyl)hexahydropyrimidine was added 75 mls. of 9% by weight aqueous ammonia solution based on the weight of the solution. The resulting mixture was agitated for 1½ hours and then allowed to stand for one hour to permit separation into an oil layer and a water layer. The layers were separated and the oil layer again treated as above-described with 75 mls. of 9% aqueous ammonia solution and the treated product permitted to form oil and water layers. The oil layer was then fractionally distilled at 150° C. under 13 mm. pressure. A cut was made when the temperature reached 170°, yielding 29.0 g. of impurities. Distillation was continued until the temperature reached 202° C. and a cut was made yielding 21.0 g. of impurities. Distillation was then continued until the temperature reached 209.5° C. and a cut was made yielding 226.5 g. of 5-amino-5-methyl-1,3-bis(2-ethylhexylhexahydropyrimidine.

The table following Example II shows a comparison of the properties of the 5-amino-5-methyl-1,3-bis(2-ethylhexyl)hexahydropyrimidine prepared in Example I by the process of my invention with the 5-amino-5-methyl-1,3-bis(2-ethylhexyl)hexahydropyrimidine prepared in Example II using the prior art method. A comparison of the results shows the effectiveness of my process in producing a substantially colorless pure 5-amino-5-methyl-1,3-bis(2-ethylhexyl)hexahydropyrimidine.

EXAMPLE II 300 g. of the impure 5-amino-5-methyl-1,3-bis(2-ethylhexyl)hexahydropyrimidine was distilled beginning distillation at 150° C. A cut was made when the temperature reached 170° C. yielding 27.5 g. of impurities. Distillation was continued until the temperature reached 203° C. and a cut was made yielding 150 g. of impurities. Distillation was then continued until the temperature reached 210° and a cut was made yielding 226.5 g. of 5-amino-5-methyl-1,3-bis(2-ethylhexyl)hexahydropyrimidine.

Table

|  | Analysis of the 5-amino-5-methyl-1,3-bis(2-ethylhexyl)-hexahydropyrimidine produced in Ex. I | Analysis of the 5-amino-5-methyl-1,3-bis(2-ethylhexyl)-hexahydropyrimidine produced in Ex. II |
|---|---|---|
| $d_{25}^{25}$ | 0.8653 | 0.8649 |
| $n_D^{25}$ | 1.4629 | 1.4628 |
| Found Neutral Equivalents | 165.83 | 160.10 |
| Color | APHA 60 | Gardner 2 |
| Calculated Neutral Equivalent | 169.50 | |

Now having described my invention, what I claim is:

1. In a process for the purification of 5-aminohexahydropyrimidines having the following formula

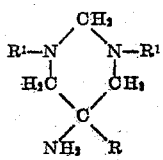

wherein R is a member selected from the group consisting of hydrogen, aryl, alkyl, and hydroxyalkyl, and $R^1$ is a member selected from the group consisting of alkyl, aralkyl, aryl, 2-hydroxyalkyl, dialkylamino, and 3,5-dioxycyclohexyl containing traces of nickel therein, the step which comprises adding to an impure 5-aminohexahydropyrimidine containing traces of nickel effective amounts of ammonia to form a nickel-ammonia complex.

2. In a process for the purification of 5-aminohexahydropyrimidines having the following formula

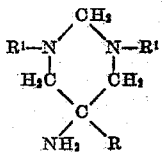

wherein R is a member selected from the group consisting of hydrogen, aryl, alkyl, and hydroxyalkyl, and $R^1$ is a member selected from the group consisting of alkyl, aralkyl, aryl, 2-hydroxyalkyl, dialkylamino, and 3,5-dioxycyclohexyl containing traces of nickel, the steps which comprise adding to an impure 5-aminohexahydropyrimidine containing traces of nickel effective amounts of an- hydrous ammonia to form a water-soluble nickel-ammonia complex with the nickel therein, adding amounts of water to dissolve the nickel-ammonia complex, permitting separation of the resulting mixture into an oil layer and a water layer containing the nickel-ammonia complex and distilling the oil layer to obtain the substantially pure 5-aminohexahydropyrimidine.

3. The process of claim 1 wherein the amount of anhydrous ammonia is from about 0.1 to about 10% by weight based on the weight of the 5-aminohexahydropyrimidine.

4. The process of claim 1 wherein the aminohexahydropyrimidine is 5-amino-5-methyl-1,3-bis(2-ethylhexyl)hexahydropyrimidine.

5. In a process for the purification of 5-aminohexahydropyrimidines containing traces of nickel, the steps which comprise adding to an impure 5-aminohexahydropyrimidine having the following formula

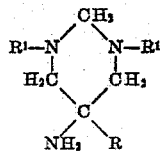

wherein R is a member selected from the group consisting of hydrogen, aryl, alkyl, and hydroxyalkyl, and $R^1$ is a member selected from the group consisting of alkyl, aralkyl, aryl, 2-hydroxyalkyl, dialkylamino, and 3,5-dioxycyclohexyl containing nickel effective amounts of an aqueous ammonia solution to form a water-soluble nickel-ammonia complex with the nickel therein, permitting separation of the resulting mixture into an oil layer and a water layer containing the nickel-ammonia complex, distilling the oil layer to obtain the substantially pure 5-aminohexahydropyrimidine.

6. The process of claim 5 wherein the aqueous ammonia solution is added as a 1–30% by weight concentration to give from 0.1 to 10% by weight of ammonia based on the 5-aminohexahydropyrimidine.

7. The process of claim 5 wherein the 5-aminohexahydropyrimidine is 5-amino-5-methyl-1,3-bis(2-ethyl-hexyl)hexahydropyrimidine.

References Cited in the file of this patent

Remy: Treatise on Inorganic Chemistry, pages 317–319 (1956).